United States Patent
Le et al.

(10) Patent No.: US 11,087,789 B1
(45) Date of Patent: Aug. 10, 2021

(54) OPTIMIZED DUAL THERMAL FLY-HEIGHT DESIGN FOR DUAL WRITERS FOR ADVANCED MAGNETIC RECORDING

(71) Applicant: Western Digital Technologies, Inc., San Jose, CA (US)

(72) Inventors: Quang Le, San Jose, CA (US);
Jih-shiuan Luo, San Jose, CA (US);
Thao A. Nguyen, San Jose, CA (US);
Kuok San Ho, Emerald Hills, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/831,728

(22) Filed: Mar. 26, 2020

(51) Int. Cl.
*G11B 5/09* (2006.01)
*G11B 5/60* (2006.01)
*G11B 5/02* (2006.01)
*G11B 5/48* (2006.01)

(52) U.S. Cl.
CPC ............... *G11B 5/607* (2013.01); *G11B 5/02* (2013.01); *G11B 5/4826* (2013.01); *G11B 5/6017* (2013.01); *G11B 5/6023* (2013.01)

(58) Field of Classification Search
None
See application file for complete search history.

(56) References Cited

U.S. PATENT DOCUMENTS

| | | | | |
|---|---|---|---|---|
| 5,465,186 | A * | 11/1995 | Bajorek | G01R 33/09 29/603.04 |
| 6,181,517 | B1 * | 1/2001 | Yanagisawa | G11B 5/4853 360/235.4 |
| 6,373,660 | B1 * | 4/2002 | Lam | G11B 5/40 360/234.5 |
| 6,603,623 | B1 * | 8/2003 | Fontana, Jr. | G11B 5/012 360/123.36 |
| 6,687,097 | B1 * | 2/2004 | Anderson | B82Y 10/00 360/323 |
| 7,133,254 | B2 | 11/2006 | Hamann et al. | |
| 8,576,509 | B1 | 11/2013 | Hogg | |

(Continued)

OTHER PUBLICATIONS

International Search Report and the Written Opinion for International Application No. PCT/US2020/035139 dated Aug. 10, 2020, 11 pages.

(Continued)

*Primary Examiner* — Peter Vincent Agustin
(74) *Attorney, Agent, or Firm* — Patterson & Sheridan, LLP; Steven H. Versteeg

(57) ABSTRACT

The present disclosure generally relates to a magnetic media drive employing a magnetic recording head. The magnetic recording head comprises a first write head and a second write head each coupled to a first pad and a second pad of a slider pad and an electrical circuit coupled to the first and second pads. The first write head comprises a first main pole and a first thermal fly height (TFH) element, and the second write head comprises a second main pole and a second TFH element. The electrical circuit comprises a capacitor and a connection to the first TFH element of the first write head, and an inductor and a connection to the second TFH element of the second write head. The electrical circuit is configured to independently power the first TFH element and the second TFH element.

8 Claims, 14 Drawing Sheets

(56) References Cited

U.S. PATENT DOCUMENTS

| | | | |
|---|---|---|---|
| 8,730,608 B1 | 5/2014 | Van Eaton et al. | |
| 8,842,506 B1 | 9/2014 | Matsumoto et al. | |
| 9,208,811 B1 * | 12/2015 | Kim | G11B 5/6076 |
| 9,564,163 B2 | 2/2017 | Contreras et al. | |
| 9,607,641 B1 * | 3/2017 | Ramakrishnan | G11B 5/4853 |
| 10,279,451 B1 | 5/2019 | Liu et al. | |
| 10,395,678 B1 | 8/2019 | Rajauria et al. | |
| 10,410,663 B1 * | 9/2019 | Macken | G11B 5/314 |
| 2001/0013994 A1 * | 8/2001 | Tokisue | G11B 21/21 360/236.3 |
| 2004/0027728 A1 * | 2/2004 | Coffey | G11B 5/127 360/313 |
| 2004/0240109 A1 * | 12/2004 | Hamann | G11B 5/105 360/125.74 |
| 2005/0070206 A1 * | 3/2005 | Kasiraj | G11B 5/3169 451/5 |
| 2006/0171056 A1 | 8/2006 | Suk | |
| 2014/0139945 A1 * | 5/2014 | Canchi | G11B 5/6029 360/75 |
| 2018/0301162 A1 | 10/2018 | Erden | |

OTHER PUBLICATIONS

Zheng et al. "The effect of write current on thermal flying height control sliders with dual heater/insulator elements," Technical Paper, Microsyst Technol, Jan. 19, 2011, vol. 17, pp. 959-964, DOI: 10.1007/s00542-010-1216-4.

Zheng et al. "Numerical simulation of thermal flying height control sliders in heat-assisted magnetic recording," Technical Paper, Microsyst Technol, Aug. 1, 2012, vol. 18, pp. 1731-1739, DOI: 10.1007/s00542-012-1618-6.

\* cited by examiner

OPTIMIZED DUAL THERMAL FLY-HEIGHT DESIGN FOR DUAL WRITERS FOR ADVANCED MAGNETIC RECORDING

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads in HDDs can have a significant effect on the overall performance and reliability of the recording device. Magnetic recording heads may be designed to achieve specific advantages, such as improved performance, but may consequently have a negative impact on other characteristics, such as decreased reliability.

For example, in conventional perpendicular magnetic recording, there is a tradeoff between linear density (bit per inch (BPI)) and track density (track per inch (TPI)), as the requirements on the write head for high BPI usually lead to a strong write pole that tends to leak magnetic field on the side track, hurting TPI capability. In magnetic recording heads utilizing shingled magnetic recording (SMR) to write tracks on a media, a wide-writing write head is used to sequentially write tracks on a media. The wide-writing write head results in the track edges have a large curvature, which limits the signal-to-noise ratio (SNR) that can be achieved. Additionally, the large curvature of the track edges prevents a strong write head from being utilized, limits the bits per track inch (BPI) capability of magnetic recording heads, and introduces adjacent track interference (ATI) and far track interference (FTI) constraints.

Additionally, some magnetic recording heads utilize two write heads to try to balance the tradeoff between BPI and TPI. However, in such a magnetic recording head, each write head typically requires its own electrical circuit to operate, requiring three to four pads for connection on a slider body or slider pad. As the size of the slider body is fixed by the industry standard, the slider pad is reduced in size to accommodate the multiple pads for the dual write heads, further increasing costs and adding the complexity and reliability on wire bonding requirements.

Therefore, there is a need in the art for an improved magnetic recording head design.

SUMMARY OF THE DISCLOSURE

The present disclosure generally relates to a magnetic media drive employing a magnetic recording head. The magnetic recording head comprises a first write head and a second write head each coupled to a first pad and a second pad of a slider pad and an electrical circuit coupled to the first and second pads. The first write head is a wide writing write head, and the second write head a narrow writing write head. The electrical circuit comprises a first sub-circuit and a second sub-circuit connected in parallel. The first sub-circuit comprises a capacitor and a connection to a first thermal fly height control (TFC) of the first write head. The second sub-circuit comprises an inductor and a connection to a second TFC of the second write head. The electrical circuit is further connected to a third TFC of a read head, the second write head comprising the read head.

In one embodiment, a magnetic recording head comprises a first write head comprising a first main pole, a second write head disposed adjacent to the first write head, the second write head comprising a second main pole, and an electrical circuit configured to be coupled to, in parallel: (1) a power source coupled to AC and DC sources, (2) a first sub-circuit, and (3) a second sub-circuit coupled to the first sub-circuit, wherein the first sub-circuit comprises a capacitor and a first connection to the first write head, and wherein the second sub-circuit comprises an inductor and a second connection to the second write head.

In another embodiment, a magnetic recording head comprises a slider pad, a first write head comprising a first main pole and a first thermal fly height element, wherein the first write head is coupled to the slider pad by a first pad and a second pad, a second write head disposed adjacent to the first write head, the second write head comprising a second main pole and a second thermal fly height element, wherein the second write head is coupled to the slider pad by the first pad and the second pad, and an electrical circuit coupled to the first and second pads, the electrical circuit comprising a capacitor, an inductor, a first connection to the first write head, and a second connection to the second write head, wherein the electrical circuit is configured to independently power the first thermal fly height element and the second thermal fly height element.

In another embodiment, a magnetic recording head comprises a first write head comprising a first thermal fly height control element, a second write head disposed adjacent to the first write head, the second write head comprising a second thermal fly height control element, wherein the second write head comprises a first read head and a third thermal fly height control element coupled to the first read head, and means for providing power, as AC current and DC current individually, or AC current and DC current simultaneously, to power one or more of the first thermal fly height element, the second thermal fly height element, and the third thermal fly height element over a common electrical circuit.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording head comprises a first write head and a second write head each coupled to a first pad and a second pad of a slider pad and an electrical circuit coupled to the first and second pads. The first write head is a wide writing write head, and the second write head a narrow writing write head. The electrical circuit comprises a first sub-circuit and a second sub-circuit connected in parallel. The first sub-circuit comprises a capacitor and a connection to a first thermal fly height control (TFC) of the first write head. The second sub-circuit comprises an inductor and a connection to a second TFC of the second write head. The electrical circuit is further connected to a third TFC of a read head, the second write head comprising the read head.

Figure 1:
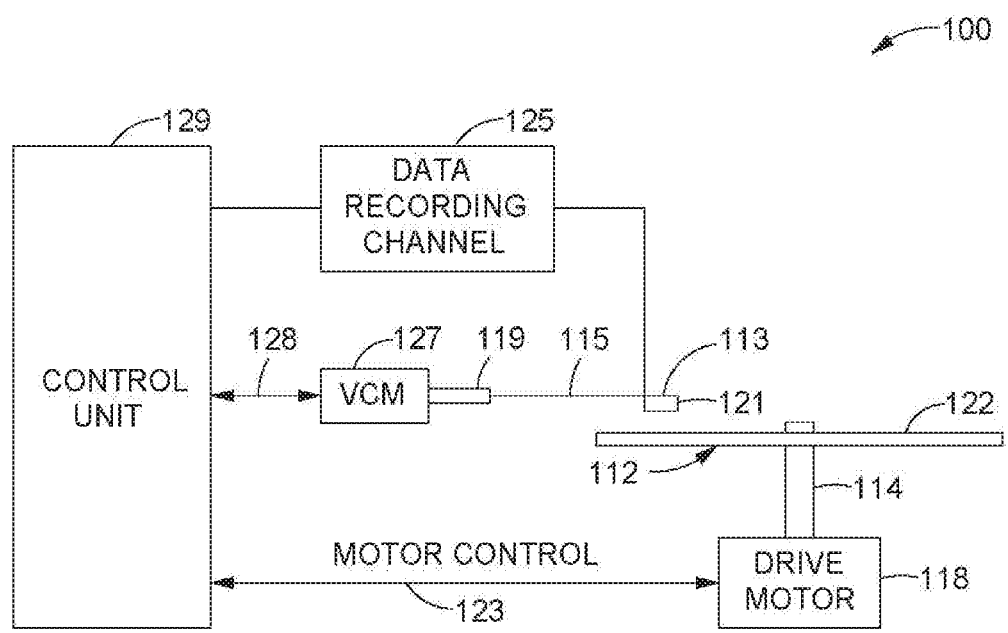
FIG. 1 illustrates a disk drive embodying various embodiments of this disclosure.

FIG. 1 illustrates a data storage device in the form of a disk drive 100 embodying various embodiments of this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction, and speed of the coil movements being controlled by the motor current signals supplied by a control unit or controller 129.

During operation of the disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 off and slightly above the media 112 surface by a small, substantially constant spacing during normal operation. The magnetic field generated from the magnetic head assembly 121 magnetizes the data bits in the media 112.

The various components of the disk drive 100 are controlled in operation by control signals generated by a control unit or controller 129, such as access control signals and internal clock signals. Typically, the control unit or controller 129 comprises logic control circuits, storage means, and a microprocessor. The control unit or controller 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support several sliders.

Figure 2A:
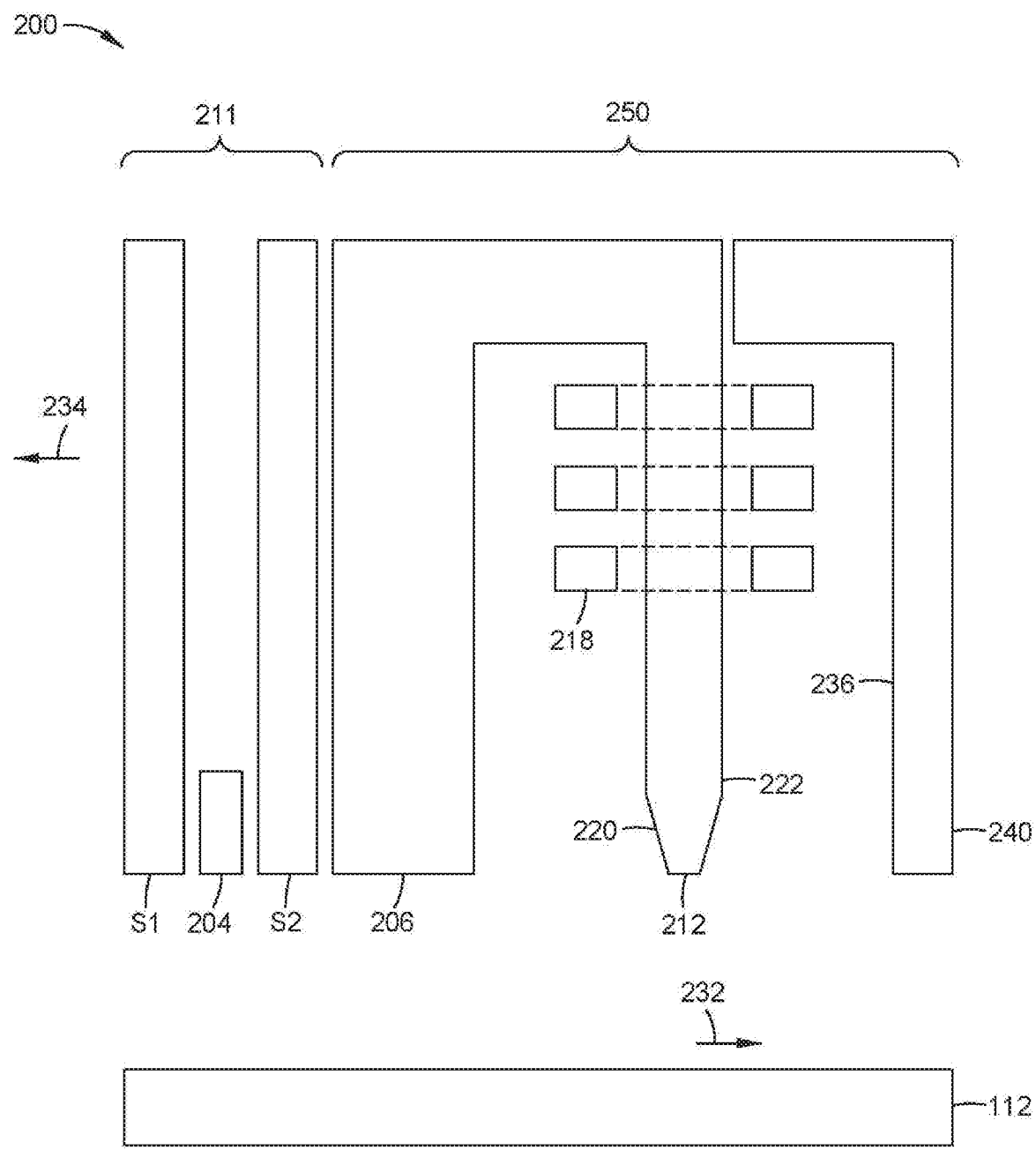
FIGS. 2A-2B illustrate fragmented, cross-sectional side views through the center of a read/write head facing a magnetic media, according to various embodiments.
Figure 2B:
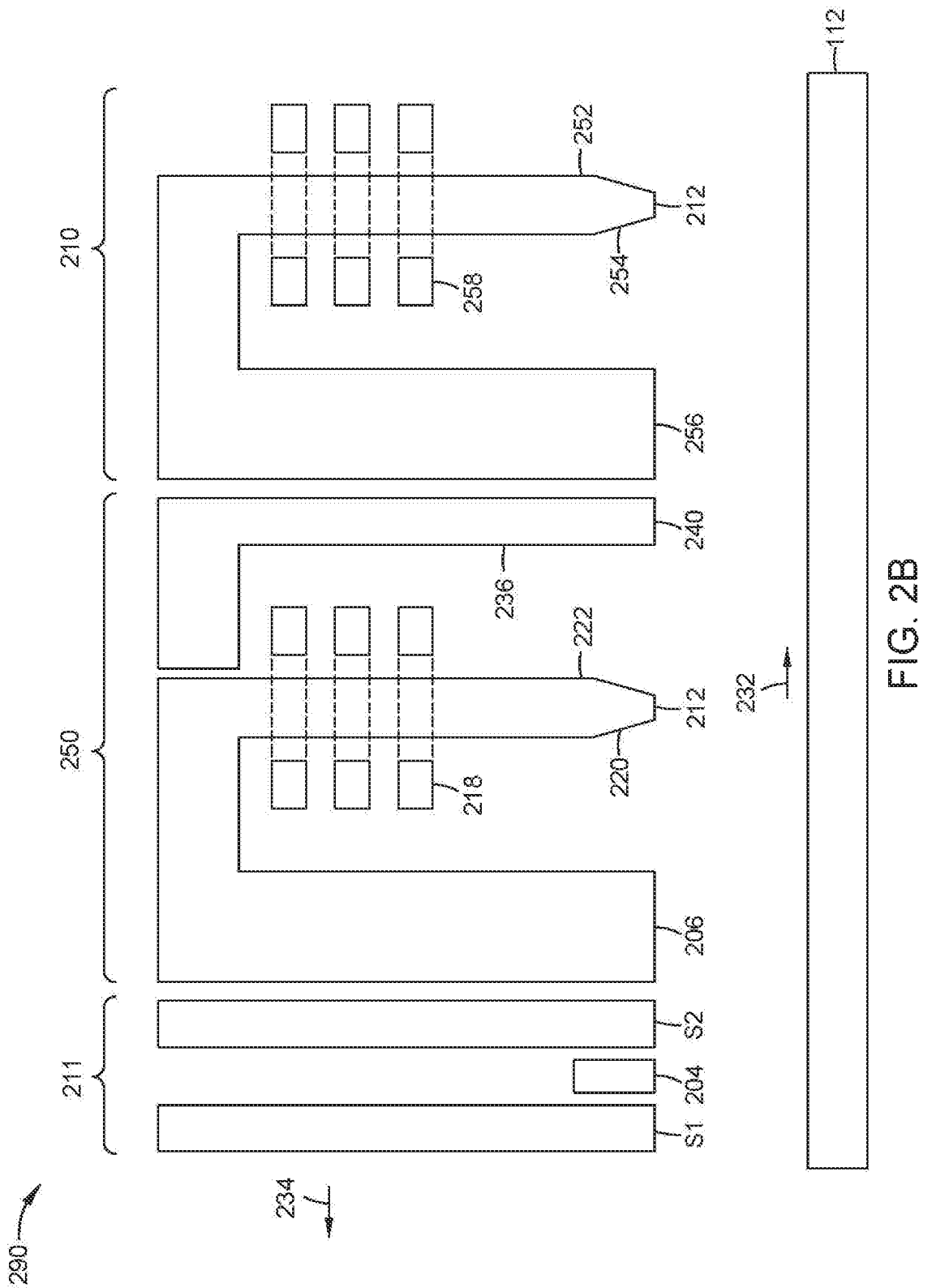

FIGS. 2A-2B illustrate fragmented, cross-sectional side views through the center of read/write heads 200, 290, facing the magnetic media 112, respectively, according to various embodiments. The read/write heads 200, 290 may each correspond to the magnetic head assembly 121 described in FIG. 1. The read/write head 200 of FIG. 2A and the read/write head 290 of FIG. 2B are the same; however, the read/write head 200 of FIG. 2A illustrates only one write head 250 while the read/write head 290 of FIG. 2B comprises two write heads 210, 250. The read/write head 200 of FIG. 2A may include another write head 210 disposed behind the write head 250, hidden from view.

The read/write head 200 of FIG. 2A includes a media facing surface (MFS) 212, such as an air bearing surface (ABS), a magnetic write head 250, and a magnetic read head 211, and is mounted such that the MFS 212 is facing the magnetic media 112. The read/write head 290 of FIG. 2B similarly includes a MFS 212, such as an ABS, a first magnetic write head 210, a second magnetic write head 250, and a magnetic read head 211, and is mounted such that the MFS 212 is facing the magnetic media 112. The write head 250 of FIG. 2A is the same as the second write head 250 of FIG. 2B. The read/write heads 200, 290 may each be an energy-assisted magnetic recording (EAMR) head. In FIGS. 2A-2B, the magnetic media 112 moves past the first and/or second write heads 210, 250 in the direction indicated by the arrow 232, and the read/write heads 200, 290 each move in the direction indicated by the arrow 234. It is noted that, in various embodiments, the two write heads may be arranged in a different configuration than this down-track setup.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes an MTJ sensing element 204 located between MR shields S1 and S2. The magnetic fields of the adjacent magnetized regions in the magnetic media 112 are detectable by the MR (or MTJ) sensing element 204 as the recorded bits.

The first write head 210 of FIG. 2B includes a return pole 256, a first main pole 254, and a first coil 258 that excites the first main pole 254. The second write head 250 of FIGS. 2A-2B includes a return pole 206, a second main pole 220, a trailing shield 240, and a second coil 218 that excites the second main pole 220. A trailing gap (not shown) and a leading gap (not shown) may be in contact with at least the second main pole 220 of the second write head 250, and a leading shield (not shown) may be in contact with the leading gap. A recording magnetic field is generated from the first and/or second main poles 220, 254. The trailing shield 240 of the second write head 250 helps make the magnetic field gradient of the second main pole 220 steep. The second main pole 220 may include a trailing surface 222, which may be parallel to a leading surface 236 of the trailing shield 240. The first main pole 254 may further comprise a trailing surface 252. The trailing shield 240 may be a magnetic material such as NiFe alloy. In one embodiment, the trailing shield 240 has a Ms of about 1.2 T to about 1.6 T.

The first and/or second main poles 220, 254 may each comprise a magnetic material such as a FeCo alloy. The first and/or second main poles 220, 254 may each be a tapered write pole (TWP) with a trailing edge taper (TET) configuration. In one embodiment, the first and/or second main poles 220, 254 each have a saturated magnetization (Ms) of 2.4 T and a thickness between about 300 nanometers (nm). Each main pole 220, 254 may comprise ferromagnetic materials, typically alloys of one or more of Co, Fe, and Ni.

FIGS. 3A-3D illustrate a first write head 310 and a second write head 350 of a magnetic recording head 300, according to various embodiments. The magnetic recording head 300 of FIGS. 3A-3D may be used in the disk drive 100 of FIG. 1 and/or the read/write heads 290 of FIG. 2B. Similarly, the first write head 310 may be the first write head 210 of FIG. 2B, and the second write head 350 may be the second write head 250 of FIG. 2B.

Figure 3A:
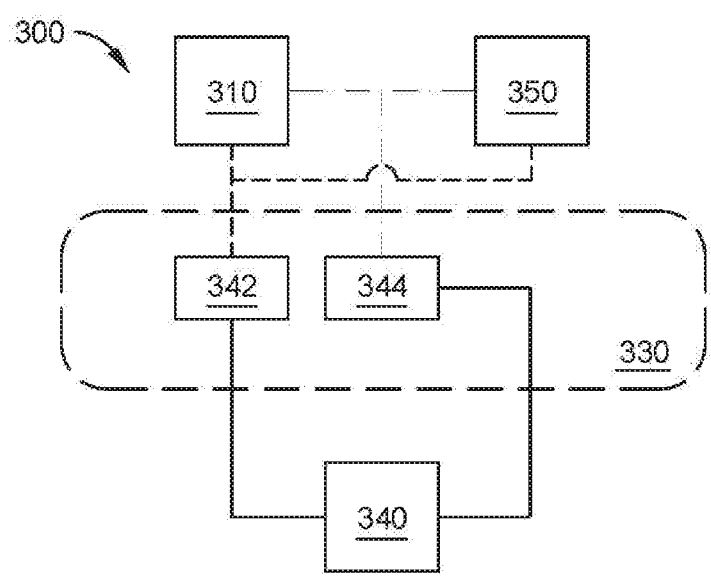
FIG. 3A illustrates a schematic view of a first write head and a second write head of a magnetic recording head connected to a slider pad and an electrical circuit, according to one embodiment.

FIG. 3A illustrates a schematic view of the first and second write heads 310, 350 of the magnetic recording head 300 connected to a slider body or slider pad 330, and an electrical circuit 340, according to one embodiment. A positive connection of a first thermal fly height control (TFC) of the first write head 310 and a positive connection of a second TFC of the second write head 350 are each connected to a first pad 342 on the slider pad 330. A negative connection of the first TFC of the first write head 310 and a negative connection of the second TFC of the second write head 350 are each connected to a second pad 344 on the slider pad 330. The electrical circuit 340 is described in further detail below in FIGS. 4A-4C as a first embodiment of the electrical circuit 340A, and in FIG. 9 as a second embodiment of the electrical circuit 340B. The first embodiment of the electrical circuit 340A and the second embodiment of the electrical circuit 340B are collectively referred to as "the electrical circuit 340".

In conventional magnetic recording heads utilizing dual write heads, a minimum of three pads on the slider body or slider pad are required, as the TFCs of each write head has individual pads for the positive connection, and an individual or shared pad for the negative connection. Unlike conventional heads, only two pads 342, 344 are required on the slider pad 330 for connection to the first and second write heads 310, 350 of the magnetic recording head 300. By reducing the number of pads 342, 344 needed, more space is available on the slider pad 330 for other connections, or the overall size of the slider pad 330 may be reduced.

Figure 3B:
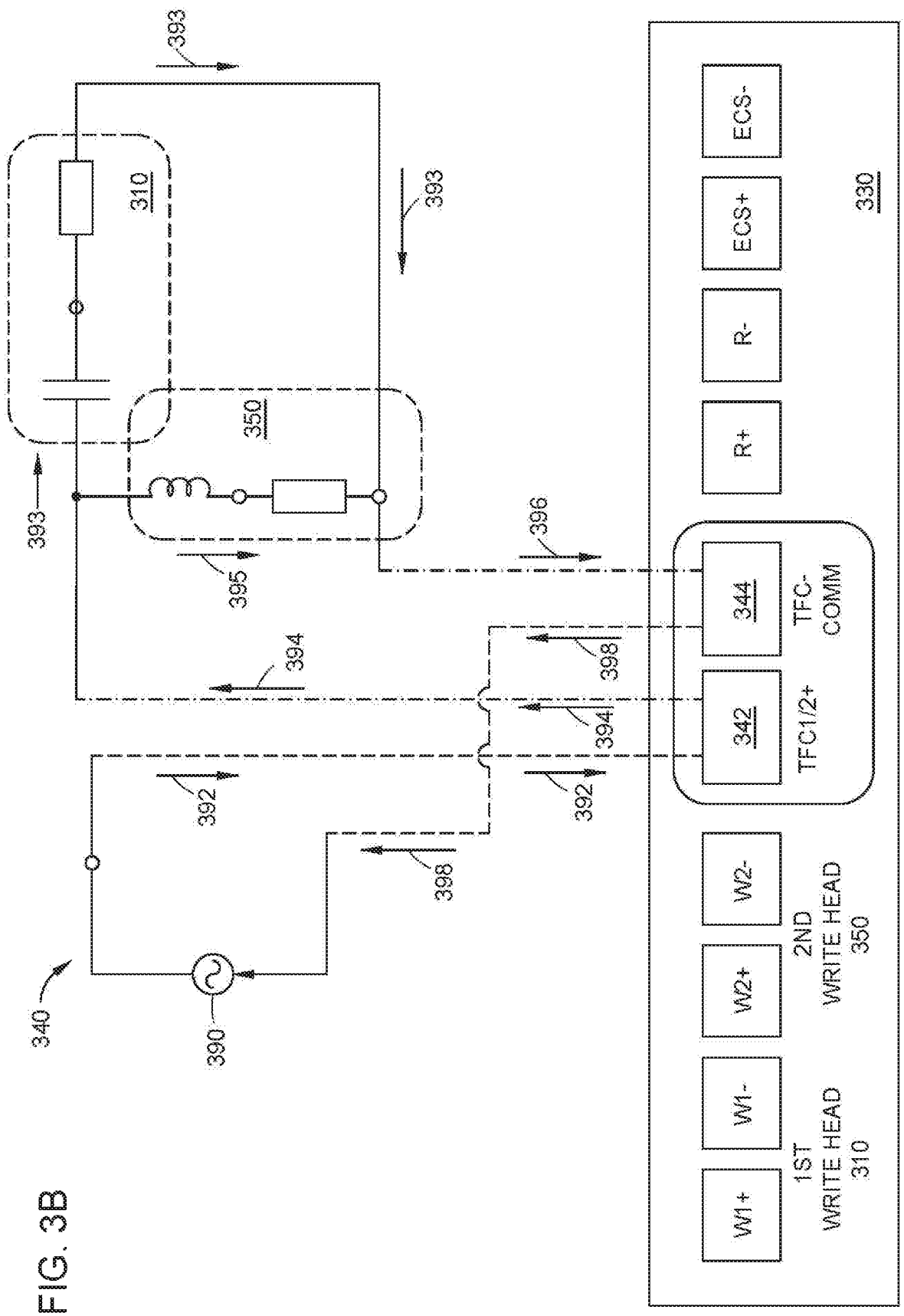
FIG. 3B illustrates a schematic overview of AC and/or DC current flowing through the electrical circuit and the slider pad connections, according to one embodiment.

FIG. 3B illustrates a schematic overview of AC and/or DC current flowing through the electrical circuit 340 and the slider pad connections, according to one embodiment. The current flowing through the electrical circuit 340 is described below in more detail in FIGS. 4A-4C and FIG. 9. As shown in FIG. 3B, the electrical circuit 340 comprises a power source 390. When AC and/or DC current is applied, the current flows from the power source 390 to the positive connection of the first TFC of the first write head 310 and/or to the positive connection of the second TFC of the second write head 350 to the first pad 342 (e.g., the positive connection pad 342 for the first and second TFCs (TFC 1/2+)) on the slider pad 330, as illustrated by arrows 392. From the first pad 342 on the slider pad 330, the current flows through the positive connection, shown by the arrows 394, of the first TFC of the first write head 310, shown by arrow 393, and/or the second TFC of the second write head 350, shown by arrow 395.

The current then continues to flow through the negative connection of the first TFC of the first write head 310 and/or to the negative connection of the second TFC of the second write head 350 to the second pad 344 (e.g., the negative connection pad 344 for the first and second TFCs (TFC-comm)) on the slider pad 330, as illustrated by arrow 396. From the second pad 344 on the slider pad 330, the current then flows back to the power source 390, shown by arrows 398. The slider pad 330 of FIG. 3B illustrates various connection pads, such as positive and negative pads for the first write head 310, positive and negative pads for the second write head 350, positive and negative pads for the first read head 368 (FIGS. 3D, 9), as denoted by R+ and R−, and pads for an embedded contact sensor (ECS), as denoted by ECS+ and ECS−.

Figure 3C:
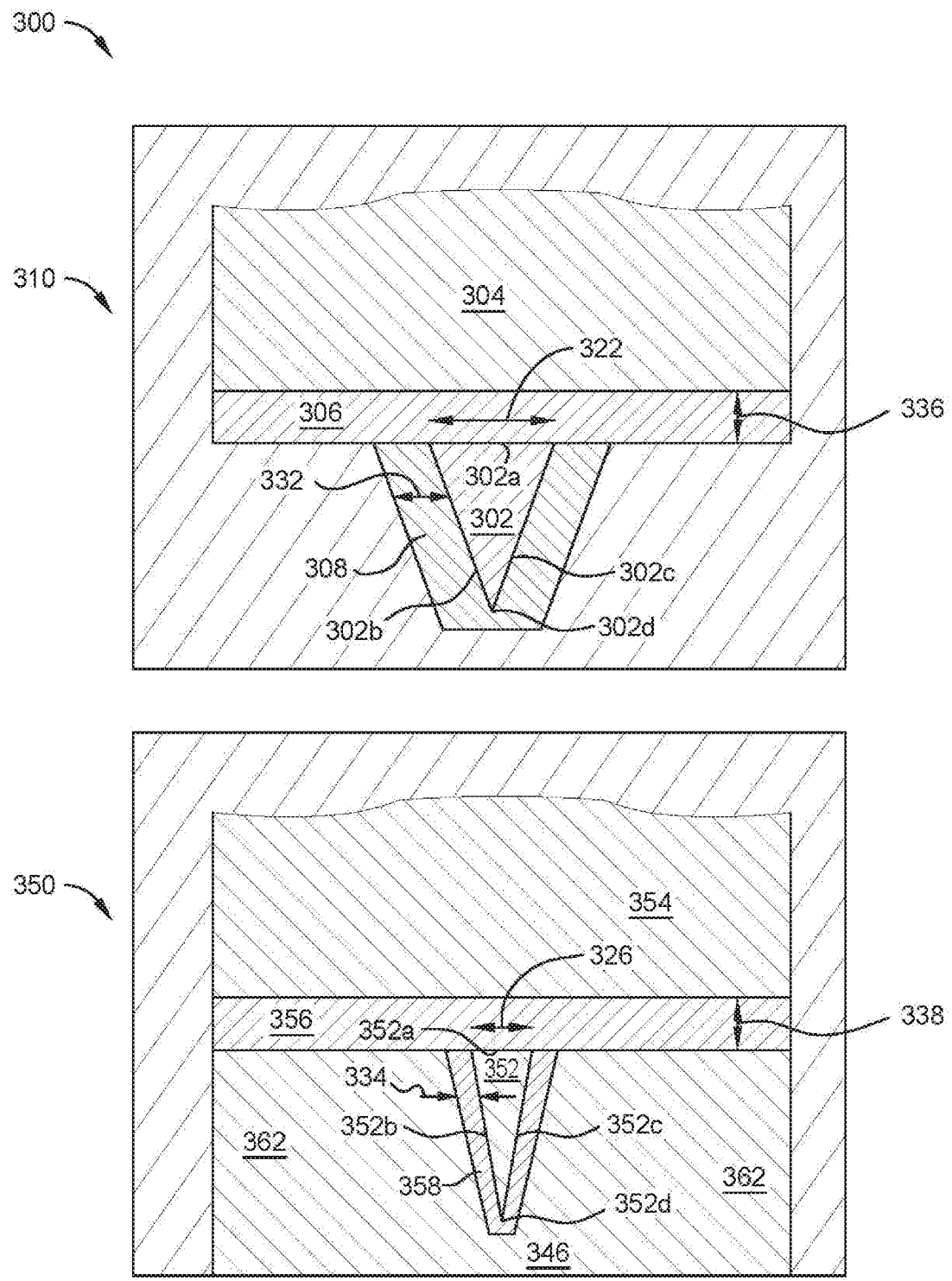
FIG. 3C illustrates the magnetic recording head comprising the first write head and the second write head disposed in a stacked formation, according to another embodiment.
Figure 3D:
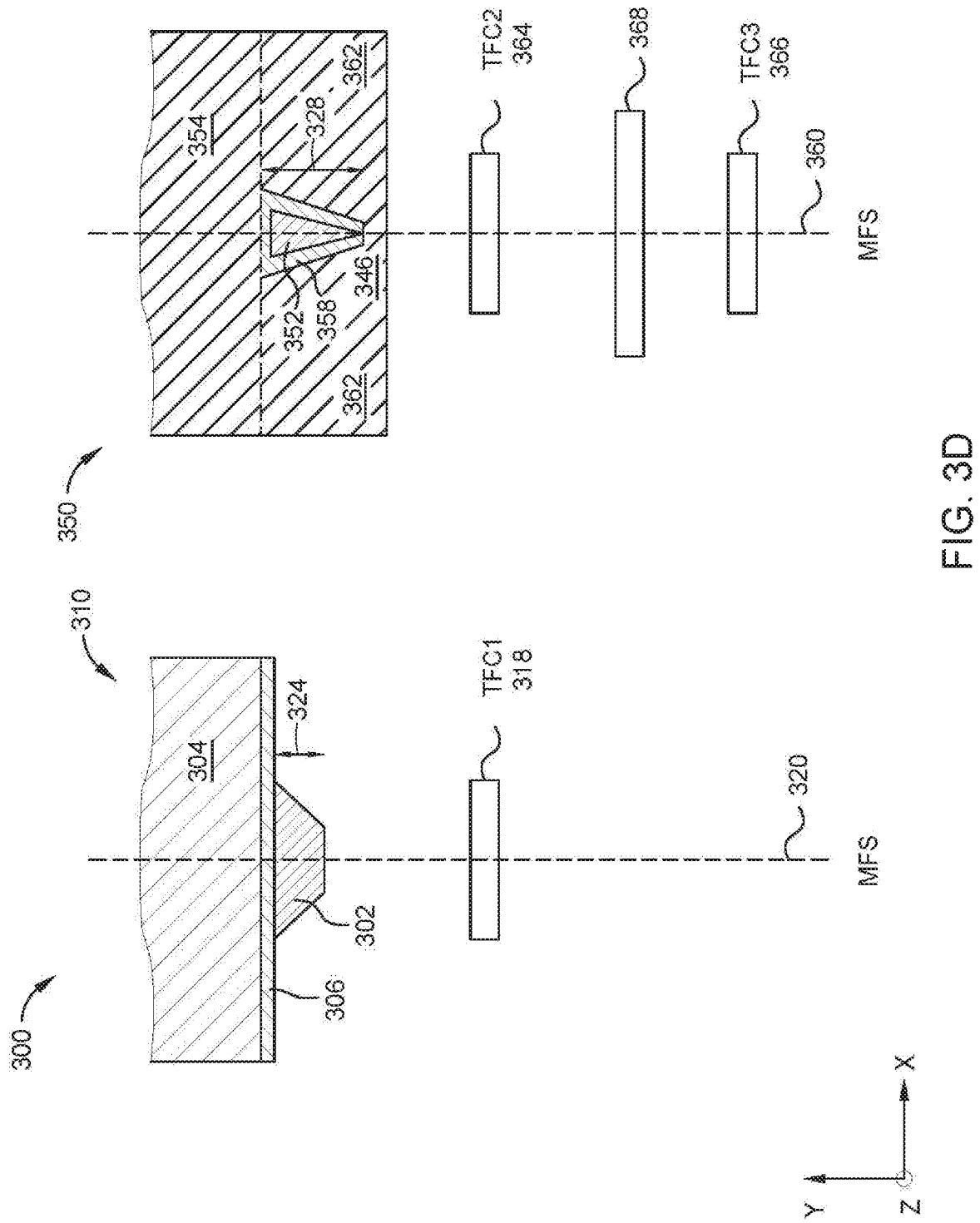
FIG. 3D illustrates the magnetic recording head comprising the first write head and the second write head disposed in a side-by-side formation, according to one embodiment.

FIGS. 3C-3D illustrate different embodiments of the same magnetic recording head 300 comprising the same first and second write heads 310, 350 in different configurations. However, some elements shown in FIG. 3C have been omitted in FIG. 3D for clarity, and vice versa. In FIG. 3C, the first write head 310 is vertically aligned with the second write head 350 such that the first write head 310 is stacked above or over the second write head 350 (i.e., aligned in the y-direction), or vice versa. In other words, the second write head 350 may be stacked above or over the first write head 310 (i.e., aligned in the y-direction) in some embodiments. In FIG. 3D, the first write head 310 is adjacent to the second write head 350 in the cross-track direction in a direction perpendicular to the arrangement of FIG. 3C (i.e., the x-direction) such that the first and second write heads 310, 350 are disposed side-by-side. While the first write head 310 is shown to be first (e.g., on the left in FIG. 3D), the second write head 350 may be first (e.g., on the left in FIG. 3D) while the first write head 310 may be second (e.g., on the right in FIG. 3D). In other words, in the stacked formation of FIG. 3C, a center axis of a first main pole 302 of the first write head 310 is linearly aligned with a center axis of a second main pole 352 of the second write head 350.

In FIG. 3D, a first trailing shield 304 of the first write head 310 is disposed adjacent to a second trailing shield 354 of the second write head 350 while in FIG. 3C, the first main pole 302 of the first write head 310 is disposed adjacent to the second trailing shield 354 of the second write head 350. Thus, FIG. 3D illustrates the first and second write heads 310, 350 in a side-by-side formation while FIG. 3C illustrates the first and second write heads 310, 350 in a stacked formation.

The first write head 310 comprises a first main pole 302 having a first surface 302a (i.e., a trailing edge), a second surface 302b, a third surface 302c, and a fourth surface 302d (i.e., a leading edge). The fourth surface 302d may be a point, as shown in FIG. 3C, or be a flat surface in other embodiments. The first write head 310 further comprises a first trailing shield 304, a first trailing gap 306 disposed between the first surface 302a of the first main pole 302 and the first trailing shield 304, and first side gaps 308 surrounding the second, third, and fourth surfaces 302b-302d of the first main pole 302. The first write head 310 further comprises a first TFC1 318 disposed along and centered with a center axis 320 of the first main pole 302, as shown in FIG. 3D. In one embodiment, the first write head 310 is a wide-writing write head optimized to increase the BPI capability.

The second write head 350 comprises a second main pole 352 having a first surface 352a (i.e., a trailing edge), a second surface 352b, a third surface 352c, and a fourth surface 352d (i.e., a leading edge). The fourth surface 352d may be a point, as shown in FIG. 3C, or could be a flat surface in other embodiments. The second write head 350 further comprises a second trailing shield 354, a second trailing gap 356 disposed between the first surface 352a of the second main pole 352 and the second trailing shield 354, and second side gaps 358 surrounding the second, third, and fourth surfaces 352b-352d of the second main pole 352. As shown in FIG. 3C, the first side gaps 308 of the first write head 310 have a first width 332 in the x-direction greater than a second width 334 of the second side gaps 358 of the second write head 350. Unlike the first write head 310, the second write head 350 further comprises a side shield 362 disposed adjacent to the second and third surfaces 352b, 352c of the second main pole 352, and a leading shield 346 disposed adjacent to the fourth surface 352d of the second main pole 352. In one embodiment, the second write head 350 is a narrow-writing write head optimized to increase the TPI capability.

The second write head 350 further comprises a second TFC2 364 disposed below the second main pole 352 and the leading shield 346, at least one read head 368 disposed below the second TFC2 364, and a third TFC 366 disposed below the at least one read head 368, as shown in FIG. 3D. The second TFC2 364, the at least one read head 368, and the third TFC 366 are all disposed along and centered with a center axis 360 of the second main pole 352. While the magnetic recording head 300 may comprise a plurality of read heads, at least one read head 368 is aligned with a center axis 360 of the second write head 350. In one embodiment, more than one read head may be aligned with the center axis 360 of the second write head 350. In another embodiment, additional read heads may be offset from the center axis 360 of the second write head 350 towards or away from the first read head 310 and/or one or more additional read heads may be aligned with the first write head 310.

In one embodiment, the first surface 302a of the first main pole 302 has a first width 322 that is greater than a second width 326 of the first surface 352a of the second main pole 352, as shown in FIG. 3C. In other words, the first main pole 302 has a greater width than the second main pole 352 in the cross-the-track direction (i.e., the x-direction). While not shown, in another embodiment, the second main pole 352 of the second write head 350 may be wider than the first main pole 302 of the first write head 310. The first main pole 302 has a first length or height 324 that is equal to or less than a second length or height 328 of the second main pole 352, as shown in FIG. 3D. In other words, the first main pole 302 has a shorter or equal length or height than the second main pole 352 in the along-the-track direction (i.e., the y-direction), or from a trailing edge of the first main pole 302 to a leading edge of the first main pole 302.

Such a configuration of the first main pole 302 having a larger first width 322 and a shorter or smaller height 324 will produce a stronger field and down-track field gradient to achieve a higher BPI while avoiding an issue called "donut shape footprint" that occurs for a wide write pole having a long or large height due to the demagnetization effect. The demagnetization effect causes a write pole or a main pole to be less saturated, thus degrading the write head field and BPI. The first write head 310 having a wide first main pole 302 and no side shields allows the first write head 310 to maximize the write field from the first main pole 302. The second write head 350 having a narrow second main pole 352 enables the second write head 350 to perform very fine, focused writes to a media.

Additionally, the first trailing gap 306 of the first write head 310 and the second trailing gap 356 of the second write head 350 may have different widths in the y-direction. In one embodiment, the first trailing gap 306 may have a first width 336 that is greater or wider in the y-direction than a second width 338 of the second trailing gap 356. In another embodiment, the first width 336 of the first trailing gap 306 may be smaller or narrower in the y-direction than the second width 338 of the second trailing gap 356. The first and second trailing gaps 306, 356 having different widths enables independent optimization of the first and second write heads 310, 350 in order to achieve the best field gradient, and thus, improved BPI capabilities.

The magnetic recording head 300 may be used by the controller 129 of the disk drive 100 to execute random writes to a media. When writing to a media, the controller 129 and the electrical circuit 340 may cause the first write head 310 to widely write every other track (e.g., the even tracks). Following the write of the even tracks by the first write head 310, the controller 129 and the electrical circuit 340 may then cause the second write head 350 to narrowly write the remaining unwritten tracks (e.g., the odd tracks). In one embodiment, the second write of the second write head 350 trims the adjacent edges of the even tracks written by the first write head 310, and thus, the writing of the media does not experience reading track edge curvature, which increases the areal density capacity (ADC).

Figure 4A:
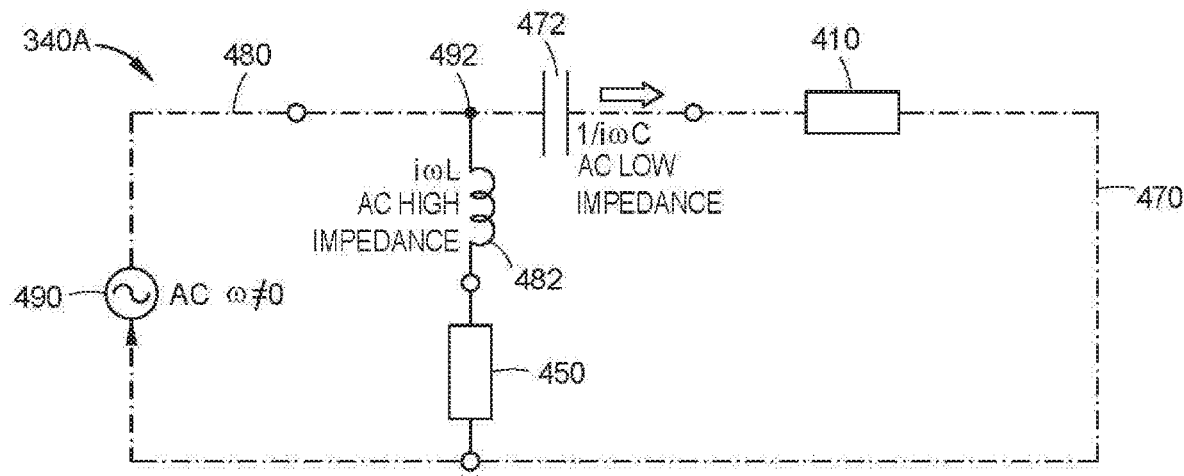
FIGS. 4A-4C illustrate a first embodiment of an electrical circuit of a magnetic recording head configured to control a first write head and a second write head with various electrical biases applied.
Figure 4B:
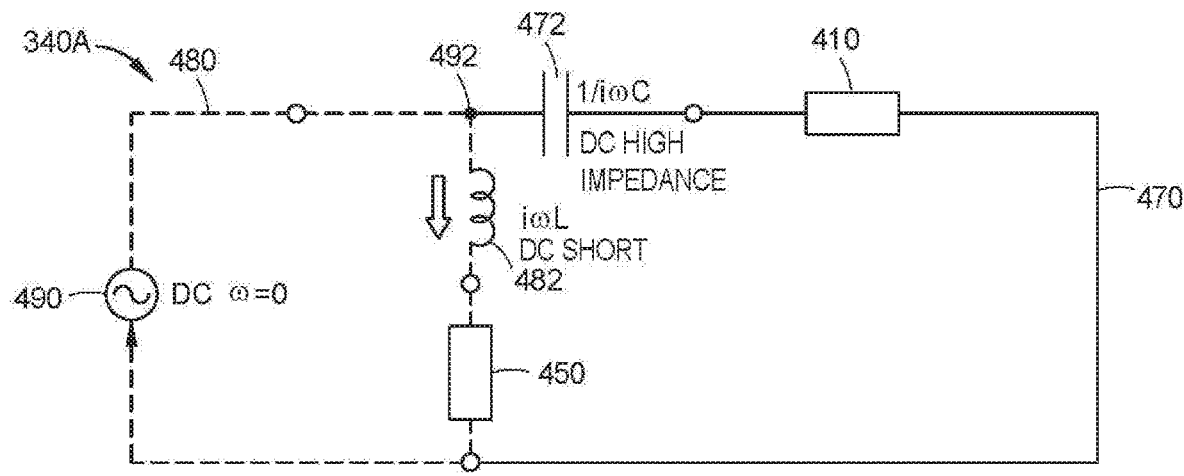
Figure 4C:
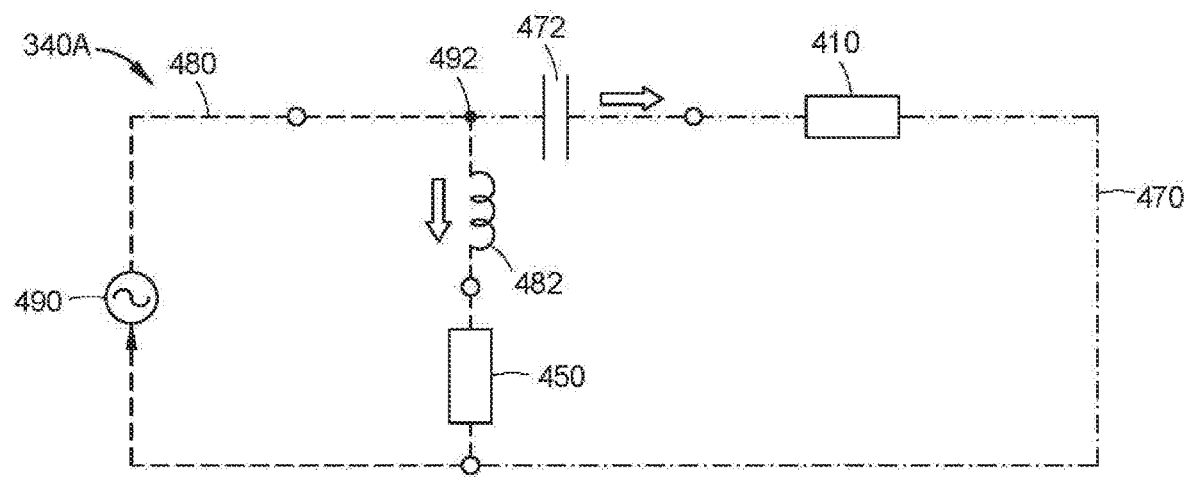

FIGS. 4A-4C illustrate a first embodiment of the electrical circuit 340A discussed in FIGS. 3A-3B with various electrical biases applied. The electrical circuit 340A is a bias tee circuit comprising a power source 490, a capacitor 472, and an inductor 482. The power source 490 is connected to both AC and DC power sources such that the power source 490 is configured to apply both AC and DC current, either individually or simultaneously. The inductor 482 has a pancake coil structure comprising a coil wrapped around a magnetic material, such as CoFe, about 16 times. The inductor 482 has an area of about 24 pmt. The inductor 482 may be placed anywhere within the magnetic recording head 300 as long as the inductor 482 is along the current line. Thus, the inductor 482 is not required to be disposed near the first or second write head 310, 350. The inductor 482 may have an inductance of about 0.15 to about 1 microhenry (μH). The capacitor 472 may have a capacitance of about 5 to about 50 picofarads (pF).

The electrical circuit 340A comprises a first sub-circuit 470 and a second sub-circuit 480 connected in parallel. The first sub-circuit 470 comprises a capacitor 472 and a first connection 410 to the first write head 310 connected in series. The first connection 410 to the first write head 310 may be connected to the first TFC1 318 or to other circuitry not shown within the first write head 310. The second sub-circuit 480 comprises an inductor 482 and a second connection 450 to the second write head 350 connected in series. The second connection 450 to the second write head 350 may be connected to the second TFC2 364 or to other circuitry not shown within the second write head 350. In one embodiment, the first connection 410 to the first write head 310 is connected to the first TFC1 318, and the second connection 450 to the second write head 350 is connected to the second TFC2 364. The first sub-circuit 470 and the second sub-circuit 480 share a common node 492. The node 492 is connected to the power source 490 and is disposed between the capacitor 472 and the inductor 482.

FIG. 4A illustrates AC current being applied to the electrical circuit 340A, causing the AC current to travel through the capacitor 472 and the first connection 410 to the first TFC1 318 of the first write head 310 of the first sub-circuit 470. Applying AC current powers or activates the first TFC1 318 of the first write head 310. Powering the first TFC1 318 of the first write head 310 comprises heating the first TFC1 318. For example, when AC current is applied, the first TFC1 318 is on (i.e., heated or active), causing the first TFC1 318 to heat up and causing the first write head 310 to protrude closer as part of a write to a media. In such a bias tee circuit, an ideal capacitor allows AC current through but blocks the DC bias. Thus, in the first sub-circuit 470, the impedance through the inductor 482 is high and the impedance through the capacitor 472 is low, directing the AC current through the capacitor 472. The AC current flows through the capacitor 472 to the first connection 410 to the first TFC1 318 of the first write head 310.

The second TFC2 364 may be either turned on or off when AC current is applied, as described further below in FIGS. 5A-8B. In one embodiment, when AC current is applied, the frequency may be adjusted such that only the first TFC1 318 is on (i.e., heated or active), only the second TFC2 364 is on, or the first TFC1 318 and the second TFC2 364 are both on. For example, at high frequency, such as about 200 MHz, the first TFC1 318 is turned on, and at low frequency, such as about 10 MHZ, the second TFC2 364 is turned on.

FIG. 4B illustrates DC current being applied, causing the DC current to travel through the inductor 482 and the second connection 450 to the second TFC2 364 of the second write head 350 of the second sub-circuit 480. Applying DC current powers or activates only the second TFC2 364 of the second write head 350. Powering the second TFC2 364 of the second write head 350 comprises heating the second TFC2 364. For example, when DC current is applied, only the second TFC2 364 is on (i.e., heated or active) and the first TFC1 318 is off, causing the second TFC2 364 to heat up and causing the second write head 350 to protrude closer as part of a write to a media. In such a bias tee circuit, an ideal inductor allows DC current through, but blocks AC current. Thus, in the second sub-circuit 480, the capacitance through the capacitor 472 is low, effectively shorting the electrical circuit 340A to direct the DC current through the inductor 482. The DC current flows through the inductor 482 to the second connection 450 to the second TFC2 364 of the second write head 350.

FIG. 4C illustrates both AC and DC current being applied, causing the AC and DC currents to simultaneously travel through both the first sub-circuit 470 and the second sub-circuit 480. Applying both AC and DC current powers or activates both the first TFC1 318 of the first write head 310 and the second TFC2 364 of the second write head 350 through the first and second connections 410, 450, respectively. Thus, both the first and second TFCs 318, 364 may be active at the same time, with AC current powering the first write head 310 through the first sub-circuit 470 and DC current powering the second write head 350 through the second sub-circuit 480.

Moreover, the applied AC and/or DC current can be used to align the first and second TFCs 318, 364 using the electrical circuit 340A. For example, due to the formation process of the magnetic recording head 300, the first and second TFCs 318, 364 may be unaligned, where the first TFC1 318 is disposed higher or lower than the second TFC2 364, or vice versa. Thus, to calibrate and/or align the first TFC1 318 and the second TFC2 364, AC current may be applied to the electrical circuit 340A to power the first TFC1 318 and/or AC or DC current may be applied to the electrical circuit 340A to power the second TFC2 364. Powering either the first TFC1 318 or the second TFC2 364 heats one or more of the first and second TFCs 318, 364, which pushes the first and/or second write heads 310, 350 down until the first and second TFCs 318, 364 are aligned with one another.

FIGS. 5A-8B illustrate four exemplary simulations for applying AC current to the first embodiment of the electrical circuit 340A to calibrate the first and second TFCs 318, 364 by adjusting the frequency of the applied AC current. The second TFC2 364 is turned at a low frequency via the inductor 482 while the first TFC1 318 is turned at a high frequency via the capacitor 472. Each of the graphs of FIGS. 5A, 6A, 7A, and 8A illustrate an inflection or crossover point 500, 600, 700, 800, respectively. The inflection or crossover point is the point where the first and second TFCs 318, 364 are near-perfectly aligned, or at a known calibration. Thus, once the first and second TFCs 318, 364 are at the inflection point (i.e., calibrated), AC or DC current may be applied to push one or both of the first and second TFCs 318, 364 down towards a media.

Figure 5A:
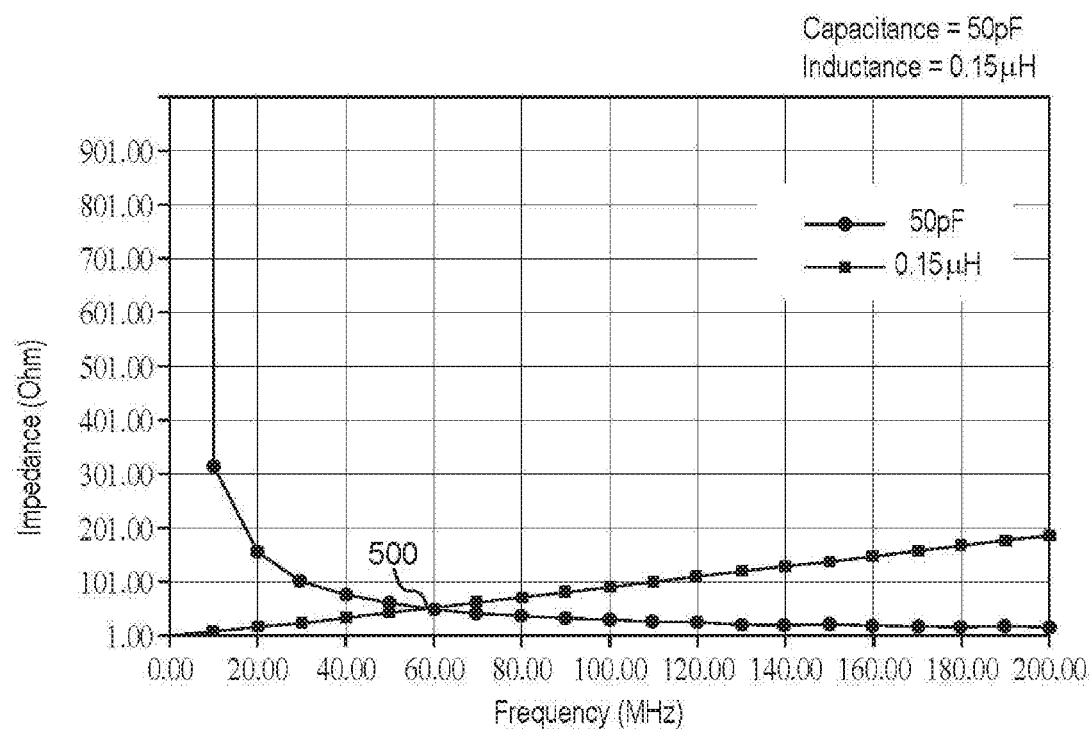
FIGS. 5A-8B illustrate exemplary simulations for applying AC current to the electrical circuit of FIGS. 4A-4C to calibrate the first and second write heads by adjusting the frequency of the applied AC current.
Figure 5B:
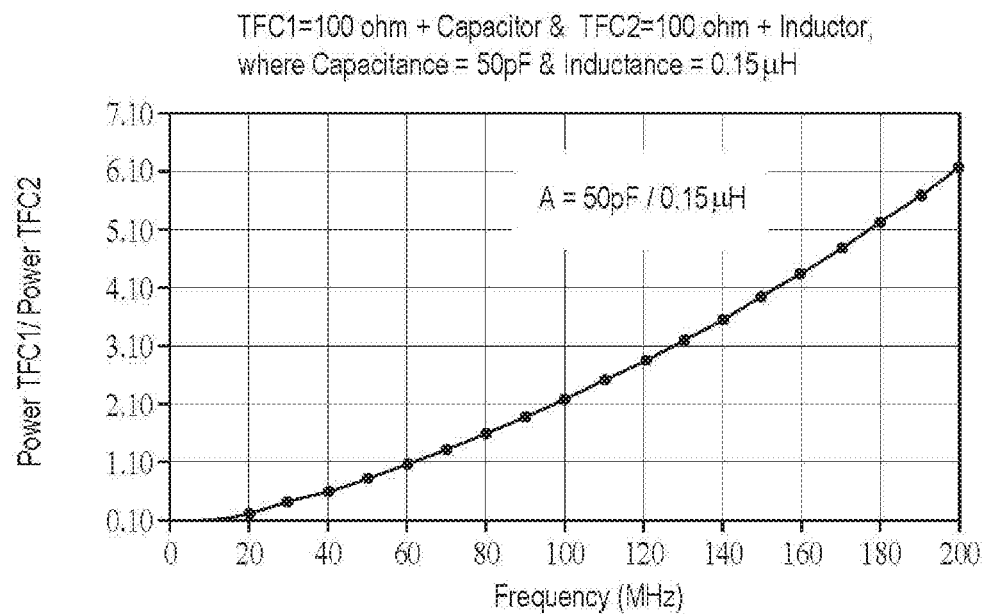

FIG. 5A illustrates impedance in ohms versus frequency in MHz for the capacitor 472 of the electrical circuit 340 having a capacitance of about 50 pF and the inductor 482 having an inductance of about 0.15 pH. FIG. 5B illustrates a ratio of power to the first TFC1 318 and the power to the second TFC2 364 versus frequency in MHz. As shown in FIGS. 5A-5B, at a frequency of about 10 MHz, the first TFC1 318 is off while the second TFC2 364 is on. At a frequency of about 200 MHz, the second TFC2 364 is off while the first TFC1 318 is on. At the inflection or crossover point 500 at a frequency of about 55 MHz, both the first TFC1 318 and the second TFC2 364 are on and aligned.

Figure 6A:
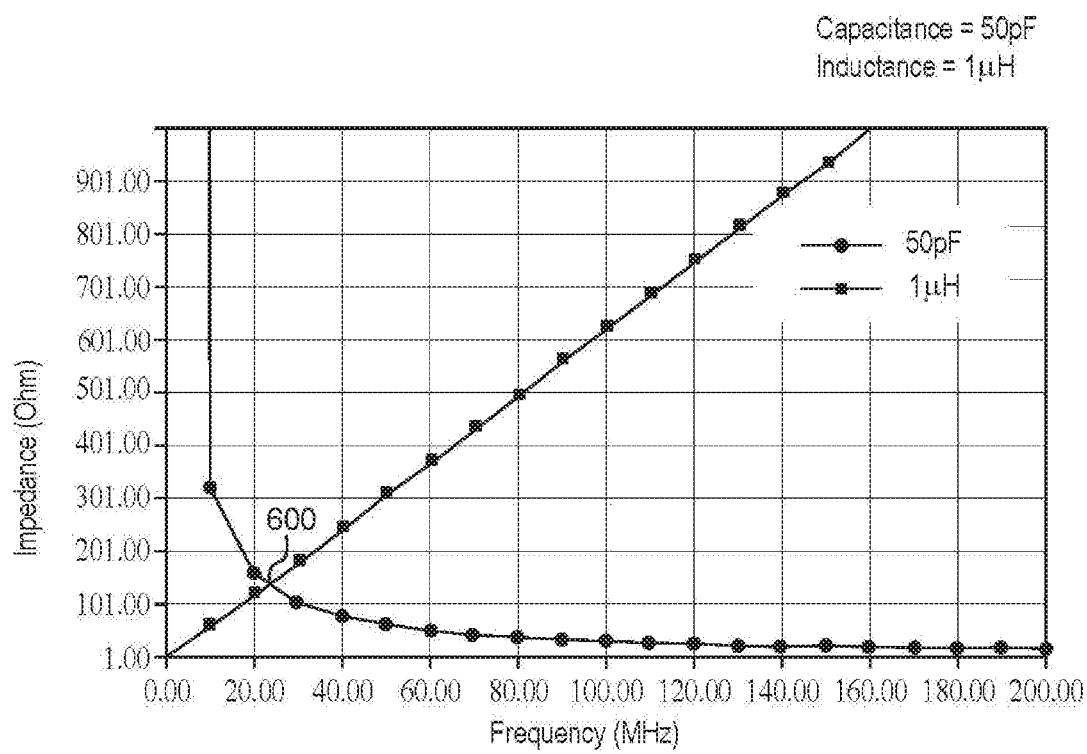
Figure 6B:
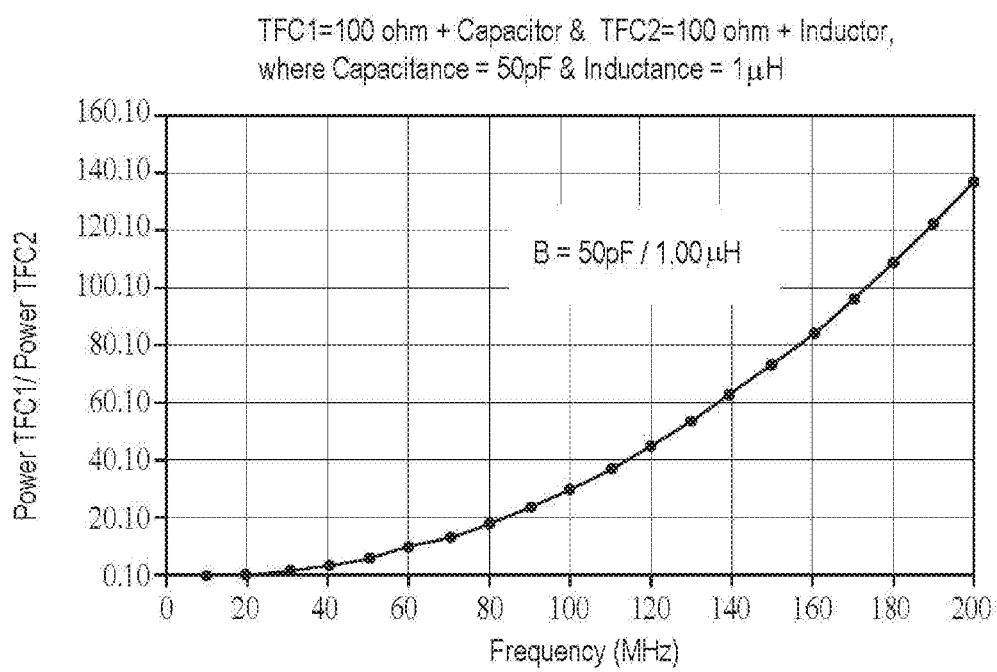

FIG. 6A illustrates impedance in ohms versus frequency in MHz for the capacitor 472 of the electrical circuit 340 having a capacitance of about 50 pF and the inductor 482 having an inductance of about 1 pH. FIG. 6B illustrates a ratio of power to the first TFC1 318 and the power to the second TFC2 364 versus frequency in MHz. As shown in FIGS. 6A-6B, at a frequency of about 10 MHz, the first TFC1 318 is off while the second TFC2 364 is on. At a frequency of about 60 MHz, the second TFC2 364 is off while the first TFC1 318 is on. At the inflection or crossover point 600 at a frequency of about 20 MHz, both the first TFC1 318 and the second TFC2 364 are on and aligned.

Figure 7A:
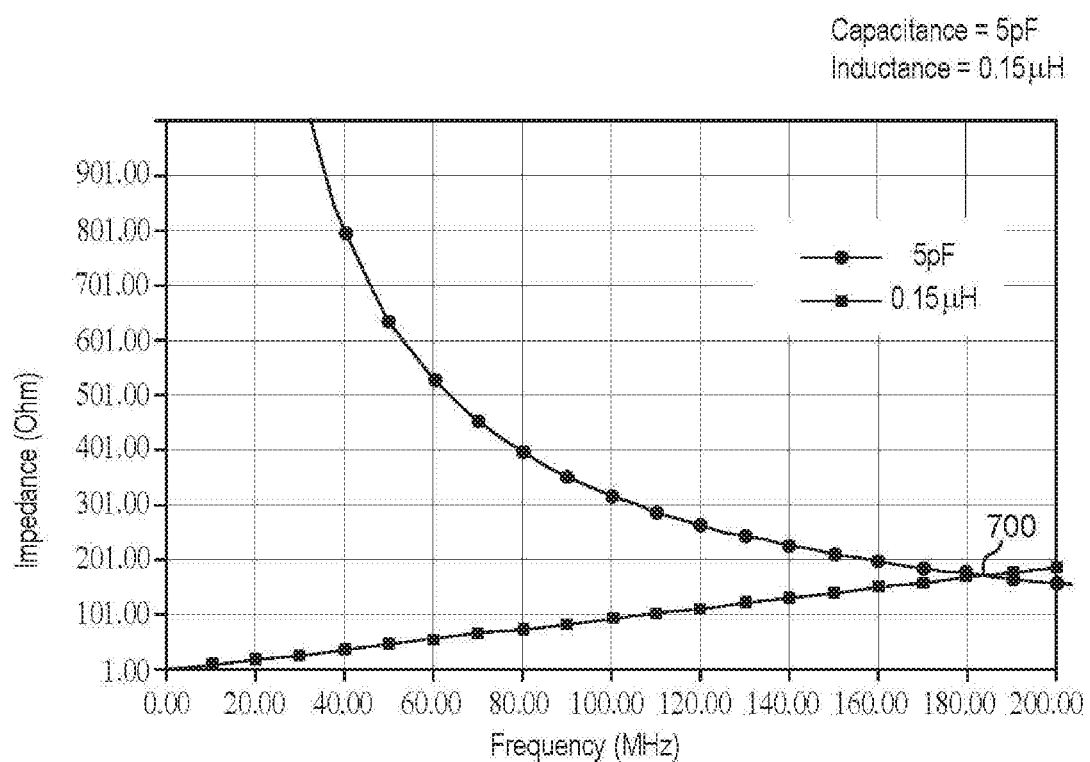
Figure 7B:
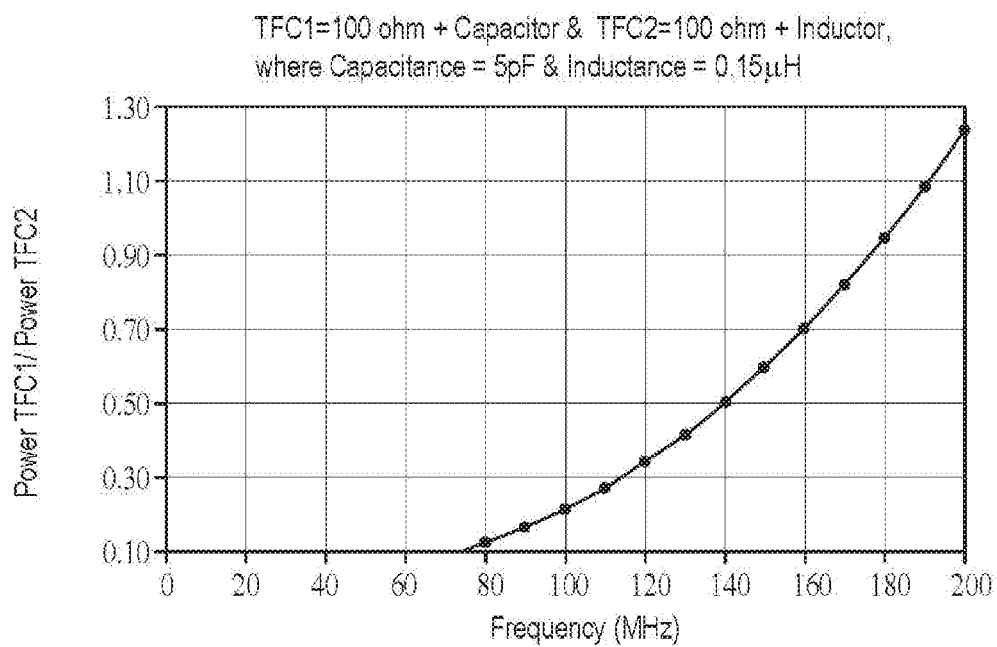

FIG. 7A illustrates impedance in ohms versus frequency in MHz for the capacitor 472 of the electrical circuit 340 having a capacitance of about 5 pF and the inductor 482 having an inductance of about 0.15 pH. FIG. 7B illustrates a ratio of power to the first TFC1 318 and the power to the second TFC2 364 versus frequency in MHz. As shown in FIGS. 7A-7B, at a frequency below about 80 MHz, the first TFC1 318 is off while the second TFC2 364 is on. At a frequency greater than 200 MHz (e.g., about 460 MHz), the second TFC2 364 is off while the first TFC1 318 is on. At the inflection or crossover point 700 at a frequency of about 180 MHz, both the first TFC1 318 and the second TFC2 364 are on and aligned.

Figure 8A:
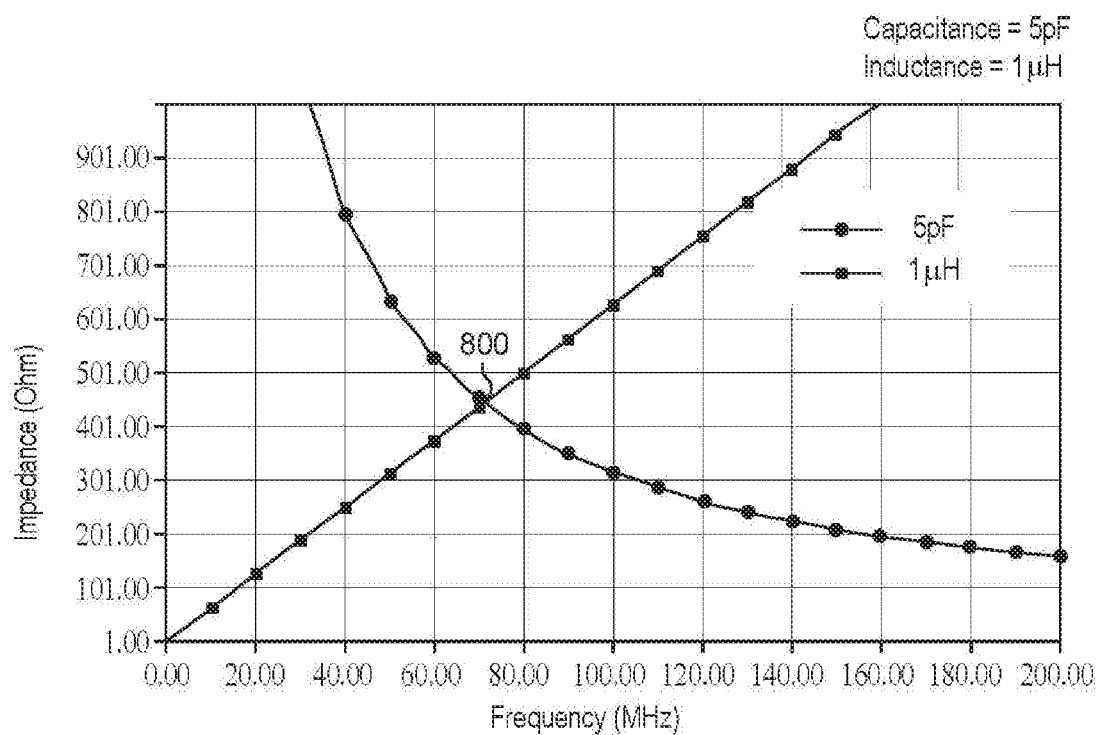
Figure 8B:
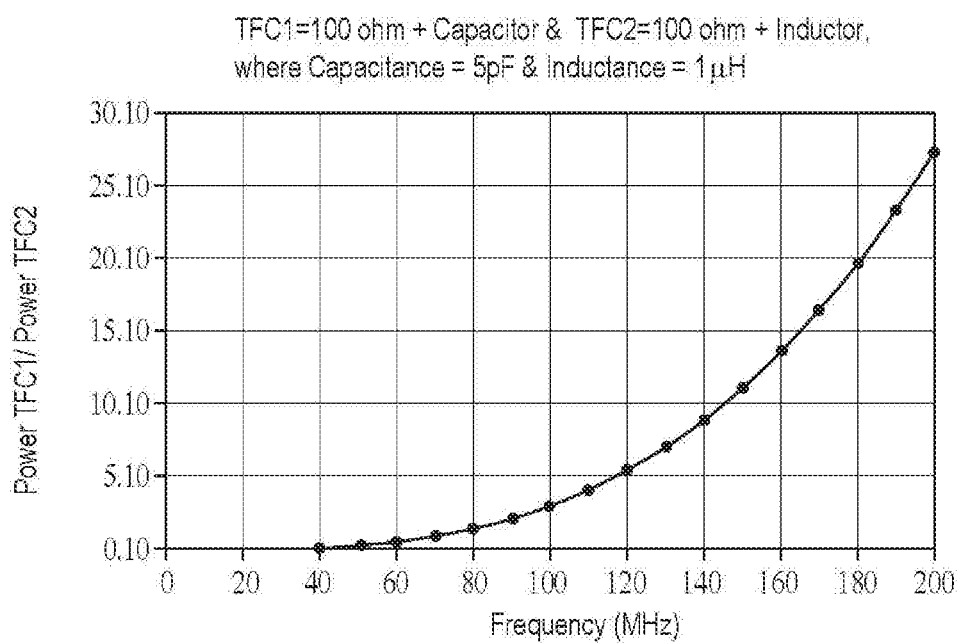

FIG. 8A illustrates impedance in ohms versus frequency in MHz for the capacitor 472 of the electrical circuit 340 having a capacitance of about 5 pF and the inductor 482 having an inductance of about 1 pH. FIG. 8B illustrates a ratio of power to the first TFC1 318 and the power to the second TFC2 364 versus frequency in MHz. As shown in FIG. 8A and/or FIG. 8B, at a frequency of about 10 MHz, the first TFC1 318 is off while the second TFC2 364 is on. At a frequency of about 150 MHz, the second TFC2 364 is off while the first TFC1 318 is on. At the inflection or crossover point 800 at a frequency of about 70 MHz, both the first TFC1 318 and the second TFC2 364 are on.

Figure 9:
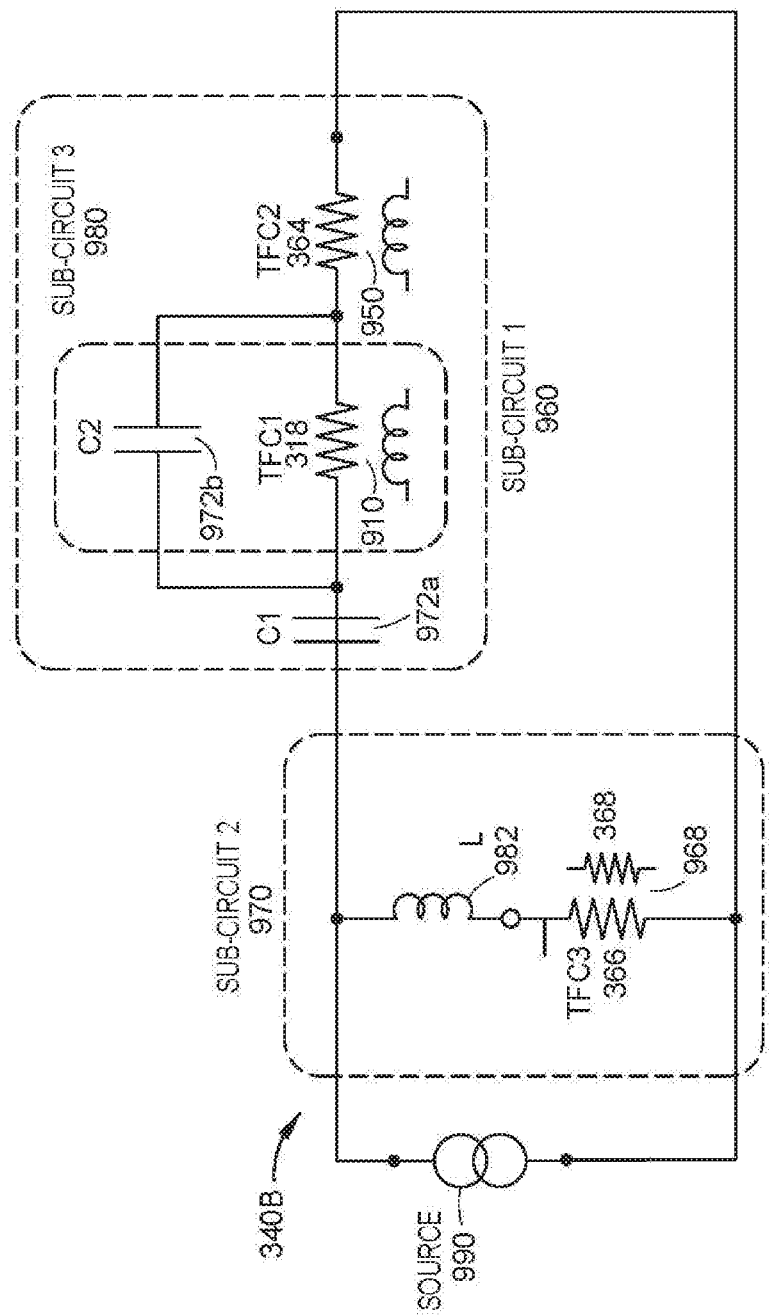
FIG. 9 illustrates a second embodiment of an electrical circuit of a magnetic recording head configured to control a first write head and a second write head with various electrical biases applied.

FIG. 9 illustrates a second embodiment of the electrical circuit 340B discussed in FIGS. 3A-3B with biases at various frequencies applied, according to another embodiment. The electrical circuit 340B is a bias tee circuit comprising a power source 990, two capacitors 972a, 972b, and an inductor 982. The power source 990 is connected to both AC and DC power sources such that the power source 990 is configured to apply both AC and DC current, either individually or simultaneously. The electrical circuit 340B comprises a first sub-circuit 960, a second sub-circuit 970, and third sub-circuit 980 connected in parallel. The first sub-circuit 960 comprises a first capacitor 972a, a first connection 910 to the first write head 310, and a second connection 950 to the second write head 350 connected in series. The first connection 910 to the first write head 310 may be connected to the first TFC1 318 or to other circuitry not shown within the first write head 310. The second connection 950 to the second write head 350 may be connected to the second TFC2 364 or to other circuitry not shown within the second write head 350.

The second sub-circuit 970 comprises an inductor 982 and a third connection 968 to the read head 368 of the second write head 350 connected in series. The third connection 968 to the read head 368 may be connected to the third TFC3 366 or to other circuitry not shown within the read head 368. The third sub-circuit 980 comprises a second capacitor 972b and the first connection 910 to the first write head 310 connected in parallel. Applying AC current activates the first TFC1 318 of the first write head 310 and/or the second TFC2 364 of the second write head 350, and applying DC current actives the third TFC3 366 of the read head 368.

Figure 10A:
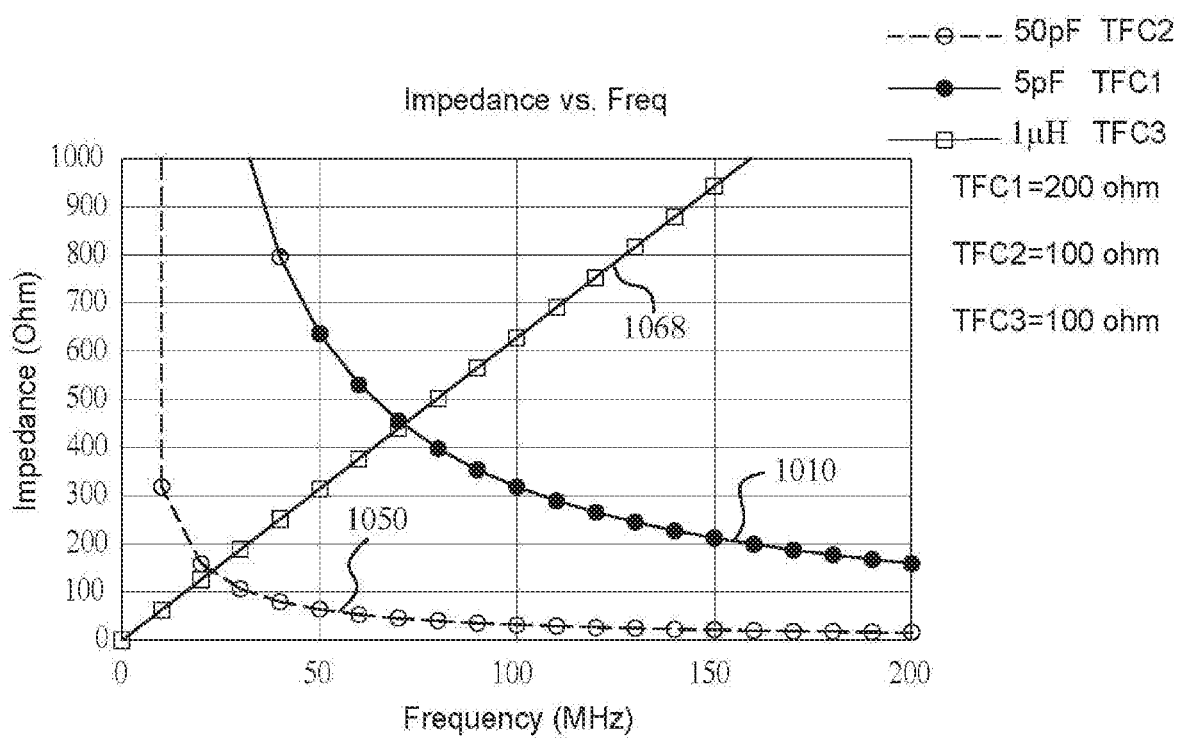
FIGS. 10A-10B illustrate exemplary simulations for applying AC current to the electrical circuit of FIG. 9 to activate the first write head, the second write head, and/or a read head.
Figure 10B:
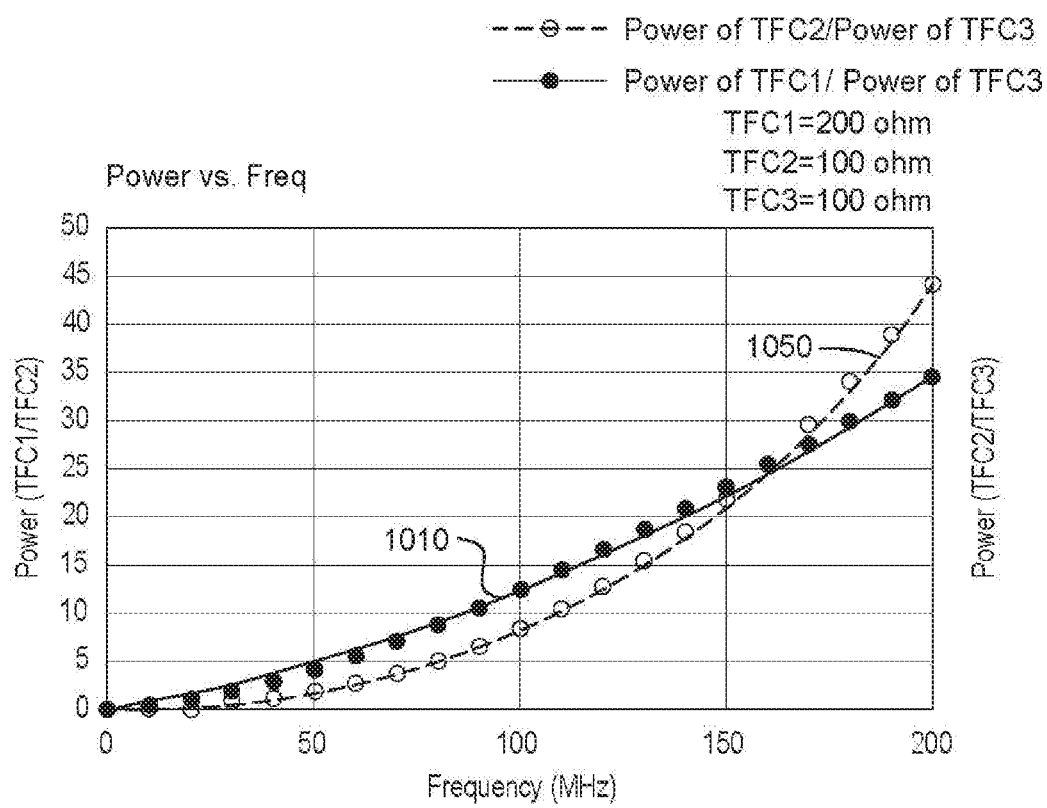

FIGS. 10A-10B illustrates AC current being applied to the second embodiment of the electrical circuit 340B, causing the AC current to travel through the first sub-circuit 960 and the third sub-circuit 980 (e.g., through the first capacitor 972a, the first connection 910 to the first write head 310, the second connection 950 to the second write head 350 of the first sub-circuit 960, and the second capacitor 972b of the third sub-circuit 980). When DC current is applied to the second embodiment of the electrical circuit 340B, the DC current travels through the second sub-circuit 970 (e.g., through the inductor 982 and the third connection 968 to the read head 368 of the second sub-circuit 970).

FIG. 10A illustrates impedance in ohms versus frequency in MHz for the second embodiment of the electrical circuit 340b, and FIG. 10B illustrates power ratios of the TFCs versus frequency in MHz for the second embodiment of the electrical circuit 340b. Applying AC current powers or activates the first TFC1 318 of the first write head 310 and/or the second TFC2 364 of the second write head 350. Powering the first TFC1 318 or the second TFC2 364 comprises heating the first TFC1 318 or the second TFC2 364. For example, when AC current is applied, the first TFC1 318 and the second TFC2 364 are on (i.e., heated or active), causing the first TFC1 318 the second TFC2 364 to heat up and by adjusting the impedance and frequency, cause the first write head 310 or the second write head 350 to protrude closer and write to a media.

As shown in FIG. 10A, at an impedance below about 100 ohm and a frequency above about 30 MHz or higher (line 1050, illustrating activating the TFC2 364), the second TFC2 364 protrudes and the second write head 350 writes to a media. At an impedance below about 100 ohm and a frequency below about 20 MHz (line 1068 in FIG. 10A, illustrating activating the third TFC3 366 and the read head 368), the third TFC3 366 protrudes, and the read head 368 reads the media. At a frequency above about 80 MHz, both the first TFC1 318 and the second TFC2 364 are on, and the frequency and the resistance of the first TFC1 318 and the second TFC2 364 may be adjusted such that the first TFC1 318 heats up more and causes the first write head 310 to protrude more than the second TFC2 364, allowing the first write head 310 to write to a media.

FIG. 10B illustrates the power ratios of the TFCs versus frequency in MHz for the second embodiment of the electrical circuit 340b. Line 1010 illustrates the power ratio of the first TFC1 318 of 200 ohm to the third TFC3 366 of 100 ohm, and line 1050 illustrates the power ratio of the second TFC2 364 of 100 ohm to the third TFC3 366 at a power of 100 ohm. At a frequency of about 90 MHz, the power ratio to the first TFC1 318 is about 10× the power ratio to the second TFC2 364, and thus, the first TFC1 318 is heated or activated. At a frequency of about 160 MHz, the power ratio to the first TFC1 318 and the power ratio to the second TFC2 364 is about equal, and thus, both the first TFC1 318 and the second TFC2 364 are heated or activated. By adjusting the frequency above and below 160 MHz, the heating between the first TFC1 318 and the second TFC2 364 can be tuned. The heating of the first TFC1 318, for example, is 50% higher near 100 MHz, while the first TFC1 318 is 20% lower near 200 M Hz than the second TFC2 364.

In such a bias tee circuit, an ideal capacitor allows AC current through but blocks the DC bias. Thus, in the first sub-circuit 960, the impedance through the inductor is high and the capacitance through the first capacitor is also high, directing the AC current through the capacitors. The AC current flows through the capacitor to the first TFC1 318 of the first write head 310 and second TFC2 364 of the second write head 350, and the selection of choosing which write head to write is done by adjusting impedance and frequency without activating the read head 368. The read head 368, which is coupled to the third TFC3 366 which may be activated by heating, may be either turned on or off when AC current is applied.

In the case when DC current is applied, the DC current travels through the inductor 982 and the third connection 968 to the read head 368 of the second sub-circuit 970. Applying DC current powers or activates only the read head 368. Powering the read head 368 comprises heating the third TFC3 366. For example, when DC current is applied, only the third TFC3 366 is on (i.e., heated or active) and the first TFC1 318 and the second TFC2 364 are off, causing the read head 368 through the third TFC3 366 to heat up and causing the read head 368 to protrude closer, as part of reading a media. In such a bias tee circuit, an ideal inductor allows DC current through but blocks AC current. Thus, in the second sub-circuit 970, the capacitance through the capacitor is low, effectively shorting the electrical circuit to direct the DC current through the inductor. The DC current flows through the inductor 982 to the read head 368.

Since the electrical circuit 340 of the magnetic recording head 300 powers the first TFC1 318 of the first write head 310, the second TFC2 364 of the second write head 350, and the third TFC 366 of the read head 368, the number of pads 342, 344 on the slider pad 330 connecting the electrical circuit 340 to each of the first and second write heads 310, 350 can be reduced. Reducing the number of require pads 342, 344 allows the overall size of the slider pad 330 to be reduced, or allows sufficient space for other connections to additional components in the magnetic recording head 300. Since space on a slider pad 330 within a magnetic recording head is a valuable commodity, various costs associated with the magnetic recording head 300 can be saved or reduced as well, such as manufacturing costs.

Moreover, since the electrical circuit 340 is configured to power the first TFC1 318 of the first write head 310, the second TFC2 364 of the second write head 350, and the third TFC3 366 of the read head 368, each TFC1/2/3 318, 364, 366 is no longer required to have two of its own connection pads on a slider pad, further reducing the amount of space being used in the magnetic recording head 300, enabling the overall size of the magnetic recording head 300 to be reduced, and further reducing the associated costs of the magnetic recording head 300. Therefore, the magnetic recording head 300 comprising the first write head 310 and the second write head 350 connected to the same electrical circuit 340 provides for optimized BPI and TPI capabilities while reducing the amount of space on the slider pad 330 required, resulting in both improved writes and reads of data on a media and reduced costs.

In one embodiment, a magnetic recording head comprises a first write head comprising a first main pole, a second write head disposed adjacent to the first write head, the second write head comprising a second main pole, and an electrical circuit configured to be coupled to, in parallel: (1) a power source coupled to AC and DC sources, (2) a first sub-circuit, and (3) a second sub-circuit coupled to the first sub-circuit, wherein the first sub-circuit comprises a capacitor and a first connection to the first write head, and wherein the second sub-circuit comprises an inductor and a second connection to the second write head.

The first write head further comprises a first thermal fly height element, wherein the second write head further comprises a second thermal fly height control element, wherein the first connection to the first write head is coupled to the first thermal fly height control element, and the second connection to the second write head is coupled to the second thermal fly height control element. Applying AC current to the power source of the electrical circuit powers the first thermal fly height element through the capacitor and the first connection to the first write head of the first sub-circuit, and applying DC current to the power source of the electrical circuit powers the second thermal fly height element through the inductor and the second connection to the second write head of the second sub-circuit. Applying both AC and DC current to the power source of the electrical circuit powers both the first thermal fly height element and the second thermal fly height element. The capacitor and the first connection to the first write head are connected in series, wherein the inductor and the second connection to the second write head are connection in series, wherein the second write head comprises a read head and a third thermal fly height element coupled to the read head. A write width of the first write head is wider than that of the second write head.

In another embodiment, a magnetic recording head comprises a slider pad, a first write head comprising a first main pole and a first thermal fly height element, wherein the first write head is coupled to the slider pad by a first pad and a second pad, a second write head disposed adjacent to the first write head, the second write head comprising a second main pole and a second thermal fly height element, wherein the second write head is coupled to the slider pad by the first pad and the second pad, and an electrical circuit coupled to the first and second pads, the electrical circuit comprising a capacitor, an inductor, a first connection to the first write head, and a second connection to the second write head, wherein the electrical circuit is configured to independently power the first thermal fly height element and the second thermal fly height element.

Applying AC current to the electrical circuit powers the first thermal fly height element through the capacitor and the first connection to the first write head. Applying DC current to the electrical circuit powers the second thermal fly height element through the inductor and the second connection to the second write head. Applying both AC and DC current to the electrical circuit powers both the first thermal fly height element and the second thermal fly height element. The inductor has a pancake coil structure. The inductor comprises a coil wrapped around a magnetic material about 16 times, and wherein the inductor has an area of about 24 $\mu m^2$. The first main pole of the first write head has a shorter height from a trailing edge of the first main pole to a leading edge of the first main pole than the second main pole of the second write head, and wherein the first main pole has a greater width in the cross-the-track direction than the second main pole.

In another embodiment, a magnetic recording head comprises a first write head comprising a first TFC element, a second write head disposed adjacent to the first write head, the second write head comprising a second thermal fly height control element, wherein the second write head comprises a first read head and a third thermal fly height control element coupled to the first read head, and means for providing power, as AC current and DC current individually, or AC current and DC current simultaneously, to power one or more of the first TFC, the second TFC, and the third TFC over a common electrical circuit.

The means for providing power to power one or more of the first TFC, the second TFC, and the third TFC is configured to provide AC current to power one or more of the first TFC and the second TFC. The means for providing power to power one or more of the first TFC, the second TFC, and the third TFC is configured to provide DC current to power the third TFC. The first TFC element is aligned with a first main pole of the first write head, wherein the second TFC element is aligned with a second main pole of the second write head, and wherein the third thermal fly height control element is aligned with the first read head.

The electrical circuit comprises a first sub-circuit comprising a first capacitor, a first connection to the first write head, and a second connection to the second write head connected in series, a second sub-circuit connected to the first sub-circuit in parallel, wherein the second sub-circuit comprises a second capacitor and the second connection to the second write head connected in series, and a third sub-circuit connected to the first sub-circuit in parallel, the third sub-circuit comprising an inductor and a third connection to the first read head connected in series. The first connection to the first write head is coupled to the first thermal fly height control element, the second connection to the second write head is coupled to the second thermal fly height control element, and the third connection to the first read head is coupled to the third thermal fly height control element. The means for providing AC current and DC current to power one or more of the first TFC, the second TFC, and the third TFC is configured to activate the first TFC by heating the first thermal fly height control element, activate the second TFC by heating the second thermal fly height control element, and activate the third TFC by heating the third thermal fly height control element.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
    a slider pad;
    a first write head comprising a first main pole and a first thermal fly height element, wherein the first write head is coupled to the slider pad by a first pad and a second pad;
    a second write head disposed adjacent to the first write head, the second write head comprising a second main pole and a second thermal fly height element, wherein the second write head is coupled to the slider pad by the first pad and the second pad; and
    an electrical circuit coupled to the first and second pads, the electrical circuit comprising a capacitor, an inductor, a first connection to the first thermal fly height element, and a second connection to the second thermal fly height element, wherein the electrical circuit is configured to independently power the first thermal fly height element and the second thermal fly height element.

2. The magnetic recording head of claim 1, wherein applying AC current to the electrical circuit powers the first thermal fly height element through the capacitor and the first connection to the first write head.

3. The magnetic recording head of claim 1, wherein applying DC current to the electrical circuit powers the second thermal fly height element through the inductor and the second connection to the second write head.

4. The magnetic recording head of claim 1, wherein applying both AC and DC current to the electrical circuit powers both the first thermal fly height element and the second thermal fly height element.

5. The magnetic recording head of claim 1, wherein the inductor has a pancake coil structure.

6. The magnetic recording head of claim 5, wherein the inductor comprises a coil wrapped around a magnetic material about 16 times, and wherein the inductor has an area of about 24 $\mu m^2$.

7. The magnetic recording head of claim 1, wherein the first main pole of the first write head has a shorter height from a trailing edge of the first main pole to a leading edge of the first main pole than the second main pole of the second write head, and wherein the first main pole has a greater width in the cross-the-track direction than the second main pole.

8. A data storage device comprising the magnetic recording head of claim 1.

* * * * *